United States Patent [19]

Nebel

[11] Patent Number: 4,913,827

[45] Date of Patent: Apr. 3, 1990

[54] PROCESS FOR PURIFYING AND DE-PYROGENATING WATER

[75] Inventor: Carl Nebel, Millington, N.J.

[73] Assignee: PCI Inc., West Caldwell, N.J.

[21] Appl. No.: 213,500

[22] Filed: Jun. 27, 1988

Related U.S. Application Data

[63] Continuation of Ser. No. 82,831, Aug. 6, 1987, abandoned.

[51] Int. Cl.$^4$ .................................................. C02F 1/32
[52] U.S. Cl. .................................... 210/748; 210/760; 210/764; 422/24
[58] Field of Search ............... 210/748, 760, 764, 765, 210/192; 422/23, 24, 900, 29

[56] References Cited

U.S. PATENT DOCUMENTS

| | | | |
|---|---|---|---|
| 4,069,153 | 7/1978 | Gunther | 210/748 |
| 4,179,616 | 12/1979 | Coviello et al. | 210/760 X |
| 4,352,740 | 10/1982 | Grader et al. | 210/760 |
| 4,372,860 | 2/1983 | Kaas | 210/748 |
| 4,400,270 | 8/1983 | Hillman | 210/748 X |
| 4,548,716 | 10/1985 | Boeve | 210/760 X |
| 4,572,821 | 2/1986 | Brodard et al. | 210/760 X |

*Primary Examiner*—Tom Wyse
*Attorney, Agent, or Firm*—Kenyon & Kenyon

[57] ABSTRACT

A method for producing highly purified pyrogen-free water comprising dissolving ozone in water, separating the gas and liquid phases, and exposing the ozone-containing water to ultraviolet radiation to destroy pyrogens in the water.

7 Claims, No Drawings

PROCESS FOR PURIFYING AND DE-PYROGENATING WATER

This application is a continuation of application Ser. No. 082,831 Aug. 6, 1987, now abandoned.

This invention relates to a method for purifying water with ozone. More particularly, this invention relates to a method for producing highly purified, pyrogen-free water which may be used by the pharmaceutical industry for forming aqueous injectable solutions.

It has long been known that ozone is useful for destroying bacteria, viruses, etc., in water, and thus to function as a sterilant for water. More recently, it has been reported that ozone also is able to destroy pyrogens present in water. See, e.g., Nebel, et al., "Ozone, The Process Water Sterilant," Pharmaceutical Manufacturing, pp. 17–23 (Apr. 1984) and U.S. Pat. No. 4,548,716. In both references, the ozone treatment of the water was followed by exposure of the ozone-treated water to ultraviolet radiation (UV) to destroy any residual ozone present in the water. Even more recently, Barker, et al., in "Destroying Pyrogens in Water," Effluent and Water Treatment Journal (Apr. 1985), reported that the pyrogen-destroying activity of ozone is enhanced by a simultaneously treatment of water with ultraviolet radiation and ozone.

None of these prior art processes, however, was fully effective in destroying pyrogens present in the water. The processes described by Nebel, et al., and by U.S. Pat. No. 4,548,716 contemplated use of storage tanks for the ozone-treated water, which allowed the ozone content to decrease to a level such that the combination with ultraviolet light was insufficient to effectively destroy pyrogens. Moreover, U.S. Pat. No. 4,548,716 taught the use of ultraviolet radiation at 1850 Angstroms (185 nanometers), which is below the range of 2500–2600 Angstroms required to efficiently convert ozone to hydroxy radicals as described by Barker, et al.

Although Barker, et al., did use ultraviolet radiation of 2580 Angstroms, the ultraviolet treatment was effected at the same time that ozone, entrained in oxygen, was being bubbled into the water being treated. Consequently, there was a two-phase gas-water system which prohibited efficient ultraviolet-induced conversion of ozone to hydroxyl radicals.

It is an object of this invention to provide an improved process for de-pyrogenating water.

It is a further object of this invention to provide a process for treating ozone-containing water with ultraviolet radiation under conditions which enhance the conversion of ozone to hydroxyl radicals.

In accordance with this invention, water to be treated is mixed with an ozone-containing gas stream, the ozone-containing aqueous phase and the gas phase are separated, and the ozone-containing aqueous phase is exposed to ultraviolet radiation to destroy pyrogens present in the water.

The water which is subjected to the process of this invention can be from any convenient source, such as tap water and the like. If the treated water is to be used for pharmaceutical purposes, it is desired that its dissolved minerals first be removed, as by deionization. It also is preferred that the water be filtered to remove undissolved substances present in the water.

The ozone which is used in the process can be from any convenient source. Typically, ozone is obtained by passing oxygen through a corona discharge, causing conversion of a portion of the ozone to be converted to ozone. A suitable ozone generator is described in U.S. Pat. No. 4,234,800 to Kenly, et al. For use in the process of this invention, it is preferred to generate ozone from pure oxygen (at least 94 volume percent oxygen), and to charge the ozone to the process as an oxygen stream containing from about 2 to about 9 weight percent ozone. An ozone concentration of about 6 weight percent, i.e., from about 5 to about 7 weight percent, is preferred.

The ozone-containing gas stream is preferably at elevated pressure, but pressures in excess of three atmospheres ordinarily are not required. Pressures in the range of from about 8 to about psig are preferred.

According to the process of this invention, the ozone-containing gas stream and the water to be treated are mixed rapidly to achieve a dissolved ozone concentration in the water in the range of from about 1 to about 8 ppm, and preferably about 6 ppm (i.e., from about 5 to about 7 ppm).

In order to achieve efficient de-pyrogenation, it is desired that mixing of the ozone-containing gas stream with water be effected in a relatively short period of time, e.g., in less than 8 seconds, and preferably in less than 3 seconds. Suitable mixing devices are in-line mixers, such as the static mixer referred to in Nebel, et al., "Water and Sewage Works," Ref. No. R-6 (1973). Suitable mixers of this type are disclosed in U.S. Pat. Nos. 3,923,288 and 4,034,965. If desired, the ozone-containing gas stream can be first introduced into the water with a venturi mixer, and the resulting mixture is charged to the static mixer to ensure thoroug mixing of the two phases and maximum transfer (i.e., at least 85 percent, and preferably at least 90 percent) of ozone from the gas stream to the water.

The rates of flow of the gas and liquid streams should be adjusted to achieve the desired concentration of ozone in the water. As will be appreciated, the concentration will be influenced by the ozone partial pressure in the gas phase (i.e., ozone concentration and total pressure). As a general rule, desired ozone concentrations are obtained when the water flow rate is greater than that of the gas flow rate, and preferably is in the range of from about 2 to 3 times the gas flow rate.

After mixing the ozone with water, the resulting two-phase mixture is transferred to a liquid-gas separator, in which the oxygen gas stream, which may contain residual ozone, is separated from the water phase. The oxygen stream, preferably after being treated appropriately to decompose residual ozone, can be vented to the atmosphere.

The gas-free aqueous phase is then passed through an ultraviolet generator, where it is exposed to ultraviolet light at a wave length of from about 259 to 260 nanometers, and preferably from about 253 to about 255 nanometers. The intensity of the ultraviolet radiation should be greater than that normally employed for achieving a germicidal effect, and preferably is from about 2 to about 3 times the amount required to achieve a germicidal effect.

The resulting water is essentially pyrogen-free, as determined by the Limulus Amoebocyte Lysate (LAL) test.

What is claimed is:

1. A method for producing pyrogen-free water which comprises mixing gaseous ozone with water to achieve a concentration of dissolved ozone in the water of from about 1 ppm to about 8 ppm, separating the gas and liquid phases, and exposing the ozone-containing water to ultraviolet radiation having a wavelength of from about 250 to 260 nanometers at an intensity sufficient to destroy pyrogens present in the water.

2. A method according to claim 1, wherein mixing is achieved in less than 8 seconds.

3. A method according to claim 2, in which mixing is achieved in a static, in-line mixer.

4. A method according to claim 3, in which the gaseous ozone is entrained in pure oxygen at a concentration of from about 2 to about 9 weight percent, and the total pressure of the gas stream is from about 1 to about 3 atmospheres.

5. A method according to claim 4, in which the ratio of the water flow rate to the gas flow rate is from about 2:1 to about 3:1.

6. A method according to claim 5, in which the intensity of the ultraviolet radiation is from about 2 to about 3 times the intensity required to achieve a germicidal effect.

7. A method according to claim 5, in which the gas is separated from water prior to ultraviolet light irradiation.

* * * * *

UNITED STATES PATENT AND TRADEMARK OFFICE
CERTIFICATE OF CORRECTION

PATENT NO. : 4,913,827
DATED : April 3, 1990
INVENTOR(S) : Nebel, Carl

It is certified that error appears in the above-identified patent and that said Letters Patent is hereby corrected as shown below:

Col. 1, line 26, change "simultaneously" to --simultaneous--.

Col 2, line 14, insert "20" before --psig--.

Col 2, line 32, change "thoroug" to --thorough--.

Signed and Sealed this

Eleventh Day of February, 1992

Attest:

HARRY F. MANBECK, JR.

*Attesting Officer*     *Commissioner of Patents and Trademarks*